(12) United States Patent
Heudorfer et al.

(10) Patent No.: US 7,614,648 B2
(45) Date of Patent: Nov. 10, 2009

(54) AIRBAG FOR AN OCCUPANT PROTECTION DEVICE

(75) Inventors: Benedikt Heudorfer, Nersingen (DE); Thomas Sievers, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 437 days.

(21) Appl. No.: 11/275,787

(22) Filed: Jan. 30, 2006

(65) Prior Publication Data
US 2006/0175813 A1    Aug. 10, 2006

(30) Foreign Application Priority Data
Feb. 10, 2005    (DE) .................. 10 2005 006 634

(51) Int. Cl.
*B60R 21/16* (2006.01)
(52) U.S. Cl. ................... 280/729; 280/730.2
(58) Field of Classification Search ............. 280/730.2, 280/729
See application file for complete search history.

(56) References Cited

U.S. PATENT DOCUMENTS

| | | | | |
|---|---|---|---|---|
| 3,792,873 | A * | 2/1974 | Buchner et al. ........... 280/743.1 |
| 3,843,150 | A | 10/1974 | Harada et al. |
| 3,907,327 | A * | 9/1975 | Pech ........................ 280/729 |
| 3,960,386 | A * | 6/1976 | Wallsten .................. 280/731 |
| 5,333,899 | A | 8/1994 | Witte |
| 5,454,595 | A * | 10/1995 | Olson et al. .............. 280/743.1 |
| 5,941,559 | A * | 8/1999 | Rudolf et al. ............ 280/729 |
| 5,984,348 | A | 11/1999 | Specht et al. |
| 6,164,696 | A * | 12/2000 | Ellerbrok et al. ........ 280/743.2 |
| 6,260,877 | B1 * | 7/2001 | Rasmussen, Sr. ........ 280/729 |
| 6,398,254 | B2 | 6/2002 | David et al. |
| 6,540,253 | B2 | 4/2003 | Acker et al. |
| 6,554,313 | B2 * | 4/2003 | Uchida .................... 280/729 |
| 6,715,786 | B1 * | 4/2004 | Willibey .................. 280/729 |
| 6,805,374 | B2 * | 10/2004 | Saderholm et al. ...... 280/730.2 |
| 7,025,375 | B2 * | 4/2006 | Drossler et al. ......... 280/729 |
| 7,198,286 | B2 * | 4/2007 | Kai ......................... 280/729 |
| 7,316,415 | B2 * | 1/2008 | Jamison .................. 280/729 |
| 7,338,069 | B2 * | 3/2008 | Breed ..................... 280/729 |
| 2002/0105173 | A1 * | 8/2002 | Saderholm et al. ...... 280/730.2 |
| 2003/0042716 | A1 * | 3/2003 | Fujiwara ................. 280/730.2 |
| 2003/0107204 | A1 * | 6/2003 | Drossler et al. ......... 280/729 |
| 2004/0164528 | A1 | 8/2004 | Boegge et al. |
| 2006/0163849 | A1 * | 7/2006 | Keshavaraj ............. 280/730.2 |
| 2006/0175813 | A1 * | 8/2006 | Heudorfer et al. ...... 280/730.2 |
| 2006/0249941 | A1 * | 11/2006 | Huebner et al. ......... 280/743.1 |

(Continued)

FOREIGN PATENT DOCUMENTS

DE    2 137 579    2/1972

(Continued)

*Primary Examiner*—Paul N Dickson
*Assistant Examiner*—Karen Jane J Amores
(74) *Attorney, Agent, or Firm*—Foley & Lardner LLP

(57) ABSTRACT

The disclosed airbag is for an occupant protection device, which protects a vehicle occupant in the event of an accident. In order for the airbag to provide a vehicle occupant with a great protective effect, an embodiment may comprise at least one supporting chamber, which gives the airbag mechanical stability in the inflated state, and at least one energy absorption chamber, which is designed to be more gas permeable than the supporting chamber. With such a configurations the energy absorption chamber absorbs more energy than the supporting chamber during the first phase of an accident.

10 Claims, 8 Drawing Sheets

U.S. PATENT DOCUMENTS

| | | | |
|---|---|---|---|
| 2007/0296188 A1* | 12/2007 | Breuninger | 280/730.2 |
| 2008/0018084 A1* | 1/2008 | Franke et al. | 280/730.2 |
| 2008/0185823 A1* | 8/2008 | Kalliske et al. | 280/729 |

FOREIGN PATENT DOCUMENTS

| | | |
|---|---|---|
| DE | 43 04 152 A1 | 8/1993 |
| DE | 196 50 665 A1 | 6/1998 |
| DE | 197 25 122 A1 | 12/1998 |
| DE | 200 06 927 U1 | 10/2000 |
| DE | 199 34 245 A1 | 2/2001 |
| DE | 100 24 293 A1 | 11/2001 |
| DE | 101 19 351 C1 | 7/2002 |
| DE | 10119351 * | 7/2002 |
| EP | 1 182 099 A1 | 2/2002 |
| FR | 2 115 985 | 7/1972 |
| GB | 1 362 672 | 8/1974 |
| WO | WO 01/54953 A1 | 8/2001 |

* cited by examiner

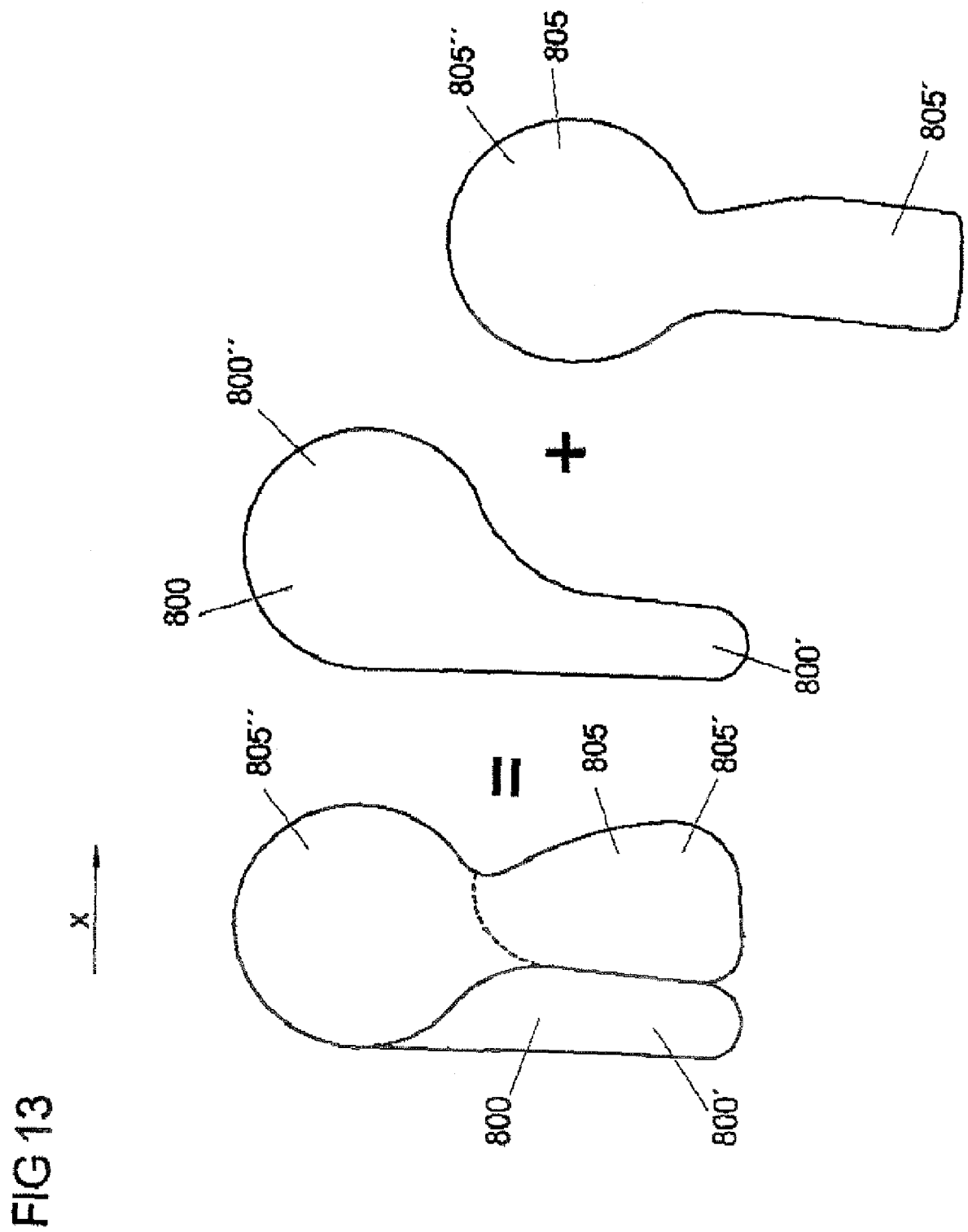

AIRBAG FOR AN OCCUPANT PROTECTION DEVICE

BACKGROUND

The present invention relates generally to an airbag for an occupant protection device for protecting a vehicle occupant in the event of an accident. The invention also relates to a method for producing an airbag.

German Laid-Open Specification DE 100 24 293 A1 (incorporated by reference herein) discloses a type of airbag with an airbag casing with a comparatively high gastightness, so that, within the inflated airbag casing, a gas pressure sufficient for a protective effect is maintained for a time of at least approximately 5 seconds. Even in the event of a vehicle overturning, the vehicle occupant remains protected for a sufficiently long time by the airbag.

Another airbag is disclosed in the publication document to the International Patent Application WO 01/54953 (incorporated by reference herein). This airbag has tubular chambers, which are deployed essentially vertically upwards. In order to stabilize the tubular chambers, additional stability elements are placed into them and are forced into a curved shape, thus increasing the stability of the elements.

SUMMARY

According to an embodiment of the invention, the airbag may have at least one supporting chamber, which gives the airbag mechanical stability in the inflated state. In addition, the airbag may have at least one energy absorption chamber, which is designed to be more gas permeable than the supporting chamber and is designed to absorb more energy than the supporting chamber in the first phase of an accident.

An embodiment of the airbag can provide the advantage of reliably protecting the vehicle occupant in all phases of an accident owing to the airbag chambers. The airbag chambers may be designed differently with regard to gastightness, namely, a relatively gastight supporting chamber and an energy absorption chamber that is more gas permeable than the supporting chamber. Thus, owing to its gas permeability, the energy absorption chamber absorbs a relatively large amount of energy in a first phase of the accident while the supporting chamber, which is more gastight than the energy absorption chamber, keeps the gas pressure for a significantly longer period of time. As a result, the position of the airbag is maintained and the protective effect of the airbag remains even during later stages of the accident.

It is to be understood that both the foregoing general description and the following detailed description are exemplary and exemplary only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 13 is a side view of the construction of the airbag of FIG. 12.

In the figures, the same reference numbers are used for identical or comparable components.

DETAILED DESCRIPTION

Figure 1:
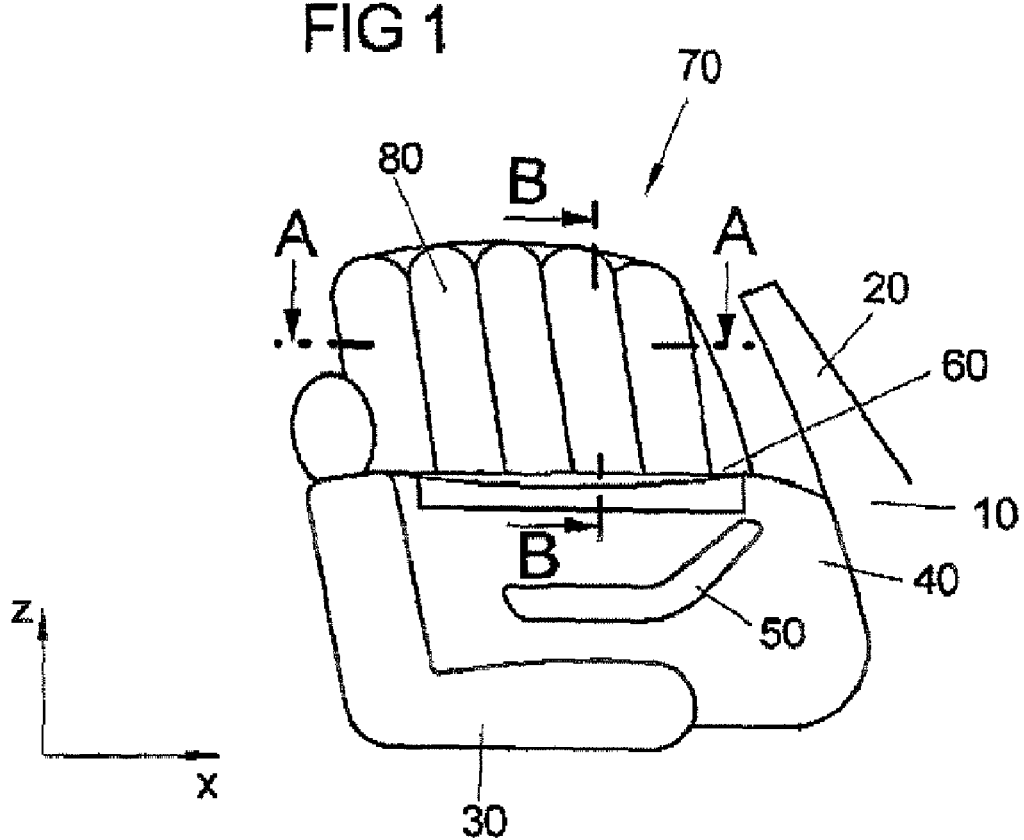
FIG. 1 is a side view of the first embodiment of an airbag.

One possible use of the airbag of the present application is, for example, in the case of open vehicles (cabriolets). In the event of an impact against a post or barrier, the energy absorption chamber brings about an energy absorption, which effectively protects the vehicle occupant. In the event of a vehicle overturning, the supporting chamber ensures that the airbag remains inflated during the entire overturning process because the supporting chamber is relatively gas impermeable in comparison to the energy absorption chamber. Thus, the probability of a vehicle occupant or the occupant's limbs being hurled out is reduced as a result.

Another use of the airbag may be as a side airbag, such as a side airbag for the head. The reason is that, in the case of side accidents, the two-chamber construction provides effective protection for the vehicle occupant.

With regard to the vehicle-overturning accidents, one embodiment of the airbag may advantageously have the casing of the supporting chamber as a gas bag of gastight design such that a supporting action for a period of at least 2 seconds, preferably of at least 5 seconds, is achieved. Experience has shown that vehicle-overturning accidents are finished within a period of 5 seconds.

In the case of a side airbag, the airbag may be fitted in the roof frame, in the vehicle seat, or in the region of the door of the vehicle. For example, the airbag may be arranged in the region of the upper edge of a door breastwork of the vehicle door in order to permit the airbag to be deployed upwards in the direction of the vehicle roof.

The airbag may have at least two supporting chambers, which are deployed upwards in parallel, or at least essentially in parallel, in a pillar-shaped manner. The two supporting chambers can be arranged spaced apart in the longitudinal direction of the vehicle and define a supporting plane or supporting surface which runs parallel or at least essentially parallel to the associated outer surface of the outer skin of the vehicle.

A particularly good supporting action can achieved by the supporting chambers if they are dimensioned in such a manner that, after deployment, they are additionally supported on the roof frame of the vehicle.

The energy absorption chamber may be held between the two pillar-shaped supporting chambers. For example, the energy absorption chamber may lie in the supporting surface defined by the supporting chambers.

The at least one supporting chamber can likewise be a planar chamber which is held together in the transverse direction of the vehicle (y-direction) by at least one clamping strap. A planar chamber of this type is to be understood, for example, as meaning a chamber which is larger in the two spatial directions perpendicular to the transverse direction of the vehicle than in the transverse direction of the vehicle.

As an alternative, an embodiment of the airbag may have two or more absorption chambers which lie on both sides of the supporting surface. In this case, at least one of the energy absorption chambers is arranged on that side of the supporting surface which faces the vehicle occupant to be protected and at least one further energy absorption chamber is arranged on that side of the supporting surface which faces away from the vehicle occupant to be protected.

According to one embodiment of the airbag, provision is made for at least two pillar-shaped supporting chambers to define an outer supporting surface facing away from the vehicle occupant and for at least two pillar-shaped supporting chambers to define an inner supporting surface facing the vehicle occupant. In this case, the two supporting surfaces lie parallel or at least essentially parallel to the associated outer surface of the outer skin of the vehicle and the energy absorption chamber is deployed between the two supporting surfaces.

The airbag can be formed simply by two material layers which are connected directly to each other. The two connected material layers are folded along a fold line and are folded onto each other in such a manner that the second material layer lies on the inside. The two sections lying on each other of the folded material layers are connected to each other in the region of their outer contour. The energy absorption chamber is then formed by the space between the sections of the second material layer lying on the inside. The two supporting chambers are, in each case, formed by the space between the first and the second material layer.

In order for the two supporting chambers to be gas impermeable, gastight materials may be used for the first material layer and for the second material layer. For example, the two material layers can be produced by a Jacquard weaving technique and can subsequently be sealed by a coating.

The first and the second material layers may also be connected to each other in a gastight manner in order to ensure the gastightness of the two supporting chambers. For example, the first and the second material layers can first be adhesively bonded to each other and can subsequently be sewn together in the region of the adhesive connections in order to increase the stability of the connection.

In order for the energy absorption chamber formed by the inner sections of the second material layer to be more gas permeable than the two supporting chambers, the two sections lying on each other of the material layers folded onto each other may be connected to each other along their outer contour, preferably by a gas-permeable seam. If, instead of a gas-permeable seam, a gastight connection is selected, then vent holes can be provided in order to achieve the gas permeability of the energy absorption chamber. Of course, when gas-permeable seams are used, vent holes may also be provided.

The two material layers may be folded onto each other, for example, along an axis of symmetry of one of the two material layers or of both material layers. The effect achieved with a symmetrical folding is that the two supporting chambers are essentially equal in size and are deployed relatively rectilinearly. As an alternative, the two materials layers may also be folded asymmetrically onto each other in such a manner that the two supporting chambers are different and, after deployment of the airbag, are inclined in the direction of the vehicle occupant.

In order to increase the lateral stability of the supporting chambers, a further additional supporting chamber may be arranged on that side of the supporting chamber which faces the vehicle occupant to be protected and/or on that side of the supporting chamber which faces away from the vehicle occupant to be protected. The additional supporting chamber, in the deployed state, is supported on the door breastwork of the vehicle door and laterally supports the position of the upwardly deployed, pillar-shaped supporting chamber(s).

In order for it to be possible for the energy absorption chamber to absorb as much energy as possible in the first phase of the accident, the energy absorption chamber may have at least one gas outlet opening through which gas can emerge from the energy absorption chamber. The effect achieved by this exit of the gas is that the energy absorption chamber can be compressed; thus, energy is absorbed.

The gas outlet opening of the energy absorption chamber can allow gas to exit directly to the outside, i.e., out of the airbag. As an alternative, the gas outlet opening may be arranged in such a manner that the gas flows out of the energy absorption chamber into another chamber of the airbag, for example, into a supporting chamber. In this case, the gas outlet opening forms an "overflow opening."

In order to avoid it being possible for a gas flow to be "directed back" from the supporting chamber into the energy absorption chamber, the gas outlet opening or the overflow opening can be provided with a one-way valve, which permits a gas flow out of the energy absorption chamber but prevents gas from overflowing in the opposite direction.

In order to ensure that the energy absorption chamber is always deployed in such a manner that optimum protection of the vehicle occupant is achieved, the energy absorption chamber may have at least one intercepting strap which optimally influences the shape of the deployed energy absorption chamber.

According to an embodiment, an airbag may be formed by the methods described below. In one embodiment of the method, a first material layer and a second material layer are connected to each other along their outer contour. The two connected material layers are folded along a fold line and are folded onto each other in such a manner that the first material layer lies on the outside and the second material layer lies on the inside. The two sections lying on each other of the folded-together casing package are subsequently connected to each other in the region of the outer contour of the casing package.

With regard to the advantages of the method and with regard to advantageous developments of the method, reference is made to the above explanations in conjunction with the airbag of the present application.

An embodiment of the present invention also may include an occupant protection device which has an airbag according to one of the embodiments of the invention, as described above.

FIG. 1 shows, in a side view, a vehicle 10 with a windscreen 20, a vehicle seat 30 and a vehicle door 40 which is equipped with a door handle 50. An occupant protection device 70, which has an airbag 80, is fitted in the region of an upper edge 60 of a door breastwork of the vehicle door 40. FIG. 1 shows the airbag 80 in the deployed state, i.e. after the onset of an accident. The airbag 80 is inflated by one or more gas generators (not illustrated in FIG. 1) of the occupant protection device 70.

Figure 2:
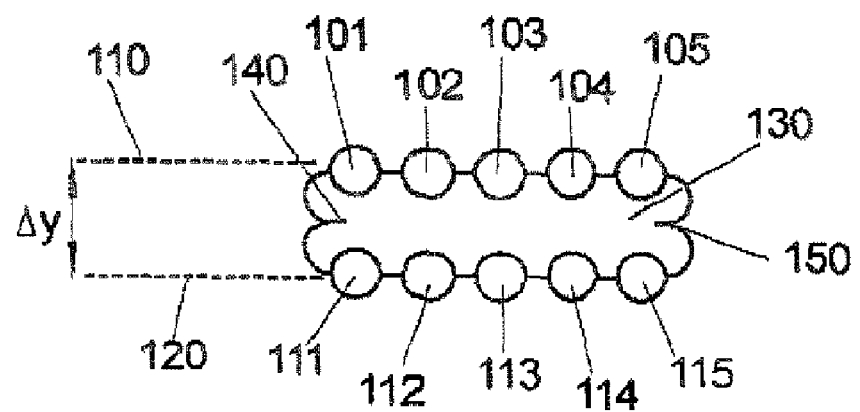
FIG. 2 is a cross sectional view of the airbag of FIG. 1 along the section line A-A.

It can be seen in FIG. 1 that the airbag 80 has pillar-like chambers or sections. Further details of the construction of the airbag 80 are illustrated in detail in FIG. 2. FIG. 2 shows the airbag 80 in a cross section along the section line A-A according to FIG. 1 in a view from above. It can be seen that the airbag 80 has five supporting chambers 101, 102, 103, 104 and 105 which are circular in cross section and are arranged in a plane 110. The plane 110 forms a type of supporting plane or supporting surface which is defined by the five supporting chambers 101 to 105.

Five further supporting chambers 111 to 115, which define a further supporting plane or supporting surface 120, can also be seen in FIG. 2. The two supporting surfaces 110 and 120 lie essentially parallel to each other and are at a distance Δy. The ten supporting chambers 101 to 105 and 110 to 115 are in each case of a gastight design or at least a virtually gastight design so that these supporting chambers can maintain their gas pressure during a period of time of at least 2 seconds, preferably of more than 5 seconds.

An energy absorption chamber 130 is situated between the two supporting planes 110 and 120. The energy absorption chamber 130 is held by the supporting chambers 101 to 105 and 111 to 115. In contrast to the ten supporting chambers, the energy absorption chamber is designed to be gas permeable. The gas permeability can be brought about, for example, by the lateral seams 140 and 150 of the energy absorption chamber 130. In addition, the casing of the energy absorption chamber 130 can have additional gas outlet openings through which the gas can flow to the outside of the energy absorption chamber 130. As an alternative or in addition, the energy absorption chamber 130 can have overflow openings which permit a gas flow from the energy absorption chamber 130 to individual supporting chambers or to all of the supporting chambers 101 to 105 and 111 to 115. In order to avoid a gas flow in the opposite direction, i.e. from the supporting chambers to the energy absorption chamber 130, overflow openings of this type may be provided with one-way valves, which only permit a gas flow out of the energy absorption chamber but not in the reverse direction.

Figure 3:
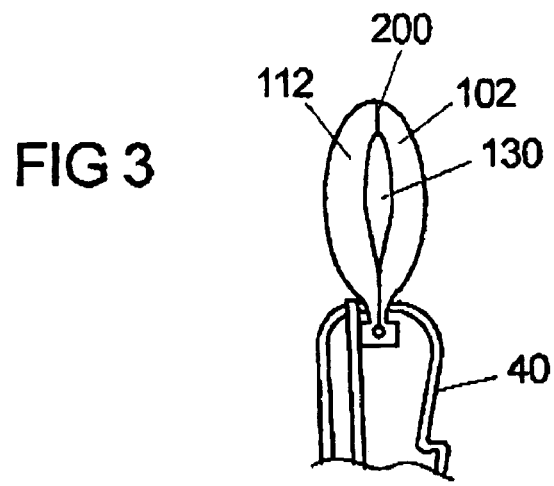
FIG. 3 is a cross sectional view of the airbag of FIG. 1 along the section line B-B.

The airbag 80 is once again illustrated in FIG. 3 in a longitudinal section along the sectional plane B-B as shown in FIG. 1. The supporting chamber 102, which faces the vehicle occupant or the vehicle interior, and the supporting chamber 112, which lies opposite the supporting chamber 102 and faces the outside of the vehicle, can be seen. In addition, it can be seen that the energy absorption chamber 130 is arranged between the two supporting chambers 102 and 112. The two supporting chambers 102 and 112 are connected to each other by an upper connecting seam 200.

Figure 4:
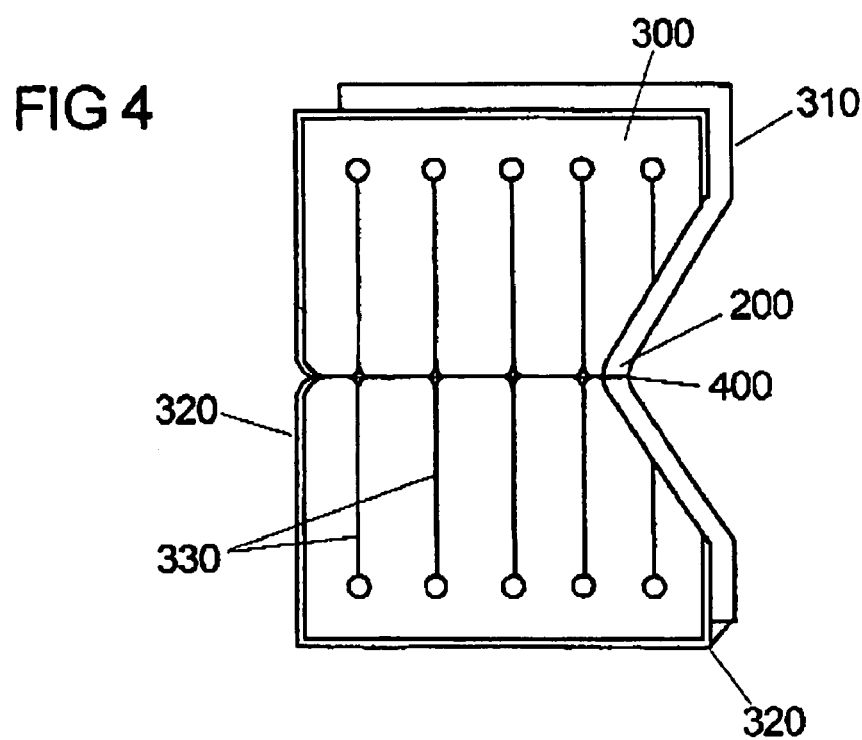
FIGS. 4 and 5 show a production method for producing the airbag.
Figure 5:
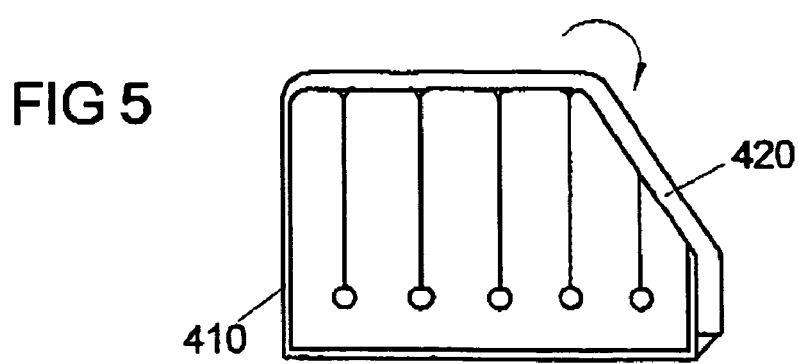

FIGS. 4 and 5 illustrate how the airbag 80 according to FIGS. 1 to 3 can be produced. A first material layer 300 and a second material layer 310, which are in each case composed of gastight material and are connected to each other in a gastight manner along their outer contour, can be seen. The two material layers 300 and 310 are, for example, adhesively bonded to each other, with the adhesive joints additionally being reinforced by seams. The contour connecting seams between the two material layers 300 and 310 are identified in FIG. 4 by the reference number 320. Also in FIG. 4, the likewise gastight, upper connecting seam 200 also connects the two material layers 300 and 310 to each other.

Furthermore, further seams 330, which connect the two material layers 300 and 310 to each other, can be seen in FIG. 4. These further seams 330 result in a segmentation of the airbag 80, which result in the pillar-shaped supporting chambers 101 to 105 and 110 to 115, seen in FIG. 2, being formed.

The two material layers 300 and 310, which are sewn together, are folded onto each other along an axis of symmetry 400 of the two material layers 300 and 310. FIG. 5 shows this in detail. The outer edges 410 and 420, which lie on each other because of the folding of the sewn-together material layers 300 and 310, are likewise sewn together with the lateral seams 140 and 150 seen to FIG. 2. The seams 140 and 150 are gas permeable, thus ensuring that the energy absorption chamber 130 is gas permeable so that gas can exit to the outside of the energy absorption chamber.

Figure 6:
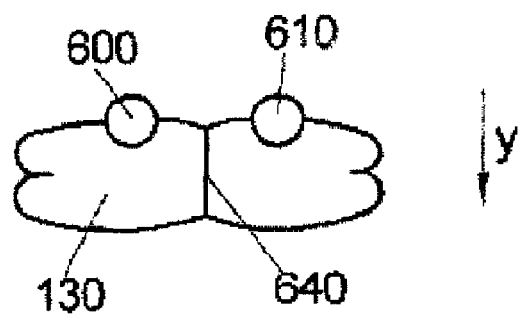
FIG. 6 is a cross sectional view of a second embodiment of the airbag along the section line A-A in FIG. 1.

FIG. 6 shows a second exemplary embodiment of the airbag 80. In FIG. 6, the airbag 80 is shown in a section along the section line A-A according to FIG. 1. It can be seen that the airbag 80 has a total of two supporting chambers 600 and 610 which define a supporting plane. An absorption chamber 130 is connected to the two supporting chambers 600 and 610. The absorption chamber 130 is positioned by the two supporting chambers 600 and 610. Since the two supporting chambers 600 and 610 are of gas impermeable design and therefore keep their gas pressure for a relatively long time, the absorption chamber 130 still remains in position even if it has already largely lost its gas pressure. Owing to its positioning, the absorption chamber 130 still maintains a certain protective action even after it loses its gas pressure because it, as a type of "protective sail" or "material sail," connects the two supporting chambers 600 and 610 to each other and prevents objects and/or body parts of the vehicle occupant from falling out of the vehicle.

An intercepting strap 640, which influences the shaping of the absorption chamber 130, can also be seen in FIG. 6. Specifically, the intercepting strap 640 prevents the absorption chamber 130 from being expanded too much or becoming "too thick" in the y-direction of the vehicle.

Figure 7:
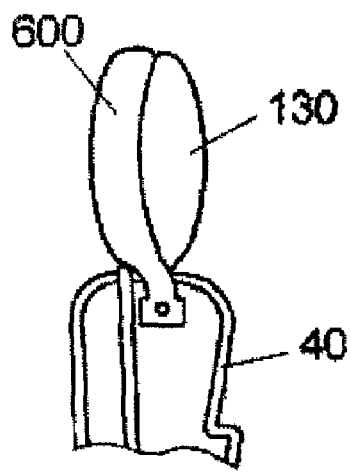
FIG. 7 is a cross sectional view of the second embodiment of the airbag along the section line B-B in FIG. 1.

The second exemplary embodiment according to FIG. 6 is also illustrated in FIG. 7 in a lateral section according to the section line B-B seen in FIG. 1. It can be seen that the absorption chamber 130 faces the vehicle occupant or the vehicle interior whereas the supporting chamber 600 is arranged on the outside of the vehicle or on the side facing away from the vehicle occupant.

Figure 8:
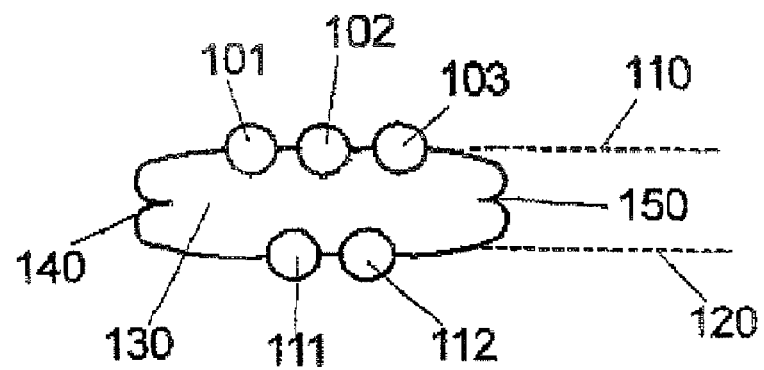
FIG. 8 is a top cross sectional view of a third embodiment of the airbag.

FIG. 8 shows a third exemplary embodiment of the airbag. In this case, it can be seen that three supporting chambers 101, 102 and 103 are arranged in the supporting plane 110 while only two supporting chambers 111 and 112 are arranged in the supporting plane 120. The energy absorption chamber 130 is situated between the two supporting planes or supporting surfaces 110 and 120. FIG. 8 also shows the seams 140 and 150, which are of gas permeable design and permit gas to flow to the outside.

Figure 9:
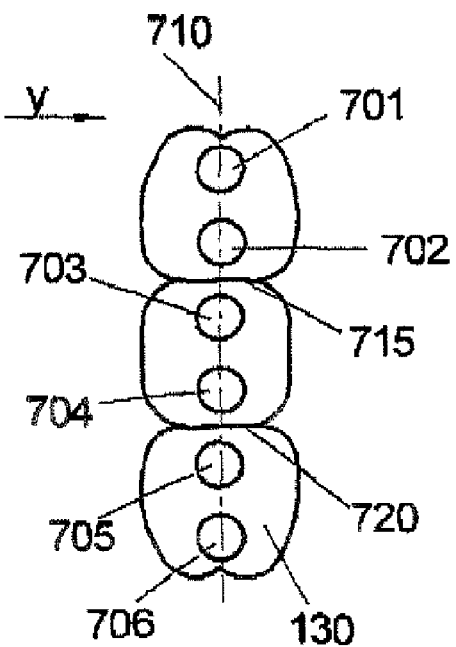
FIG. 9 is a top cross sectional view of a fourth embodiment of the airbag.

FIG. 9 shows a fourth exemplary embodiment of the airbag. In this case, a total of six supporting chambers 701 to 706 lie in a plane or a "supporting surface" which is identified by the reference number 710. The six supporting chambers 701 to 706 are situated within an energy absorption chamber 130, which is equipped with two intercepting straps 715 and 720. The two intercepting straps 715 and 720 restrict the expansion of the absorption chamber 130 in the y-direction of the vehicle.

Figure 10:
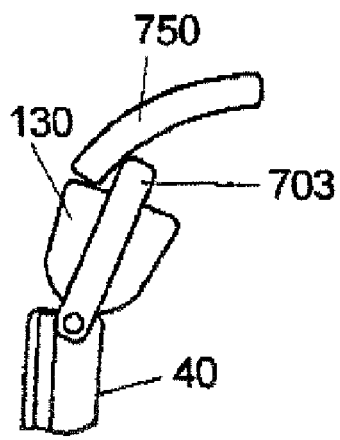
FIG. 10 is a side cross sectional view of the airbag of FIG. 9.

FIG. 10 shows the airbag 80 according to FIG. 9 in a side view. This view shows one of the supporting chambers 703 and the energy absorption chamber 130, which is arranged on both sides of the supporting plane 710 defined by the supporting chambers 701 to 706. It can furthermore be seen that the supporting chambers 701 to 706 also support the airbag 80 in the region of the vehicle structure, e.g. the roof strut or the B pillar. Specifically, the upper region of the supporting chambers is supported, for example, on the inside on the roof frame 750 so that the airbag 80 is held between the door breastwork on door 40 and the roof frame 750.

Figure 11:
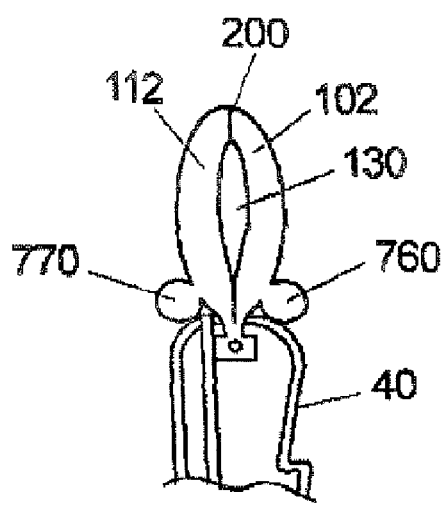
FIG. 11 is a side cross sectional view of a fifth embodiment of the airbag.

A fifth exemplary embodiment of an airbag 80 can be seen in FIG. 11. The airbag 80 in this embodiment essentially corresponds to the airbag according to FIGS. 1 to 3 with the difference that there are two additional supporting chambers 760 and 770. The additional support chambers 760 and 770 rest directly on the upper edge of the door breastwork of the vehicle door 40 and, therefore, exert a lateral supporting action on the vertical supporting chambers. Specifically, the additional supporting chambers 760 and 770 prevent the airbag 80 from being able to "bend away" to the inside of the vehicle or to the outside of the vehicle.

Figure 12:
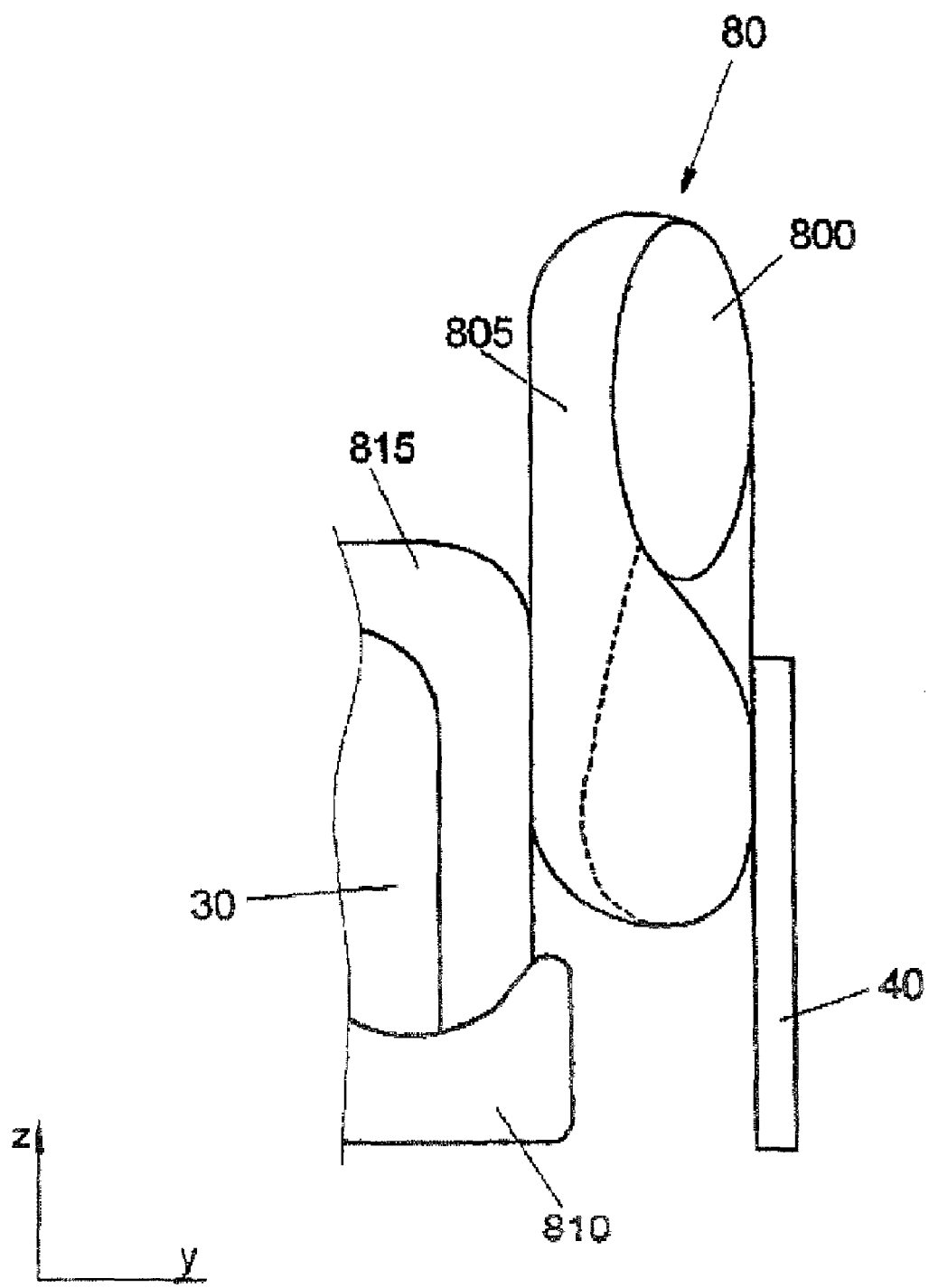
FIG. 12 is a front view of a sixth embodiment of the airbag.

FIG. 12 shows a sixth exemplary embodiment of the airbag 80 in a front view (view counter to the direction of travel). The airbag 80 comprises a supporting chamber 800 and an energy absorption chamber 805. In addition, the vehicle seat 30 with a lower seat surface 810 and a seat back 815 can be seen.

The construction of the airbag 80 of FIG. 12 is shown in more detail in the side view in FIG. 13. It can be seen that the two chambers are placed onto each other in the longitudinal direction of the vehicle (x-direction) in such a manner that the lower region 800' of the supporting chamber 800 is arranged between the seat back 815 and the door 40 and the lower region 805' of the energy absorption chamber 805 is situated in front of it in the direction of travel and thus protects the thorax region of the vehicle occupant. The upper regions 800" and 805" of the two chambers lie one behind the other in the y-direction, so that the vehicle occupant's head impacts against the upper region 805" of the energy absorption chamber 805. The position of upper region 805" is supported by the upper region 800" of the supporting chamber 800, which is situated behind it.

Figure 14:
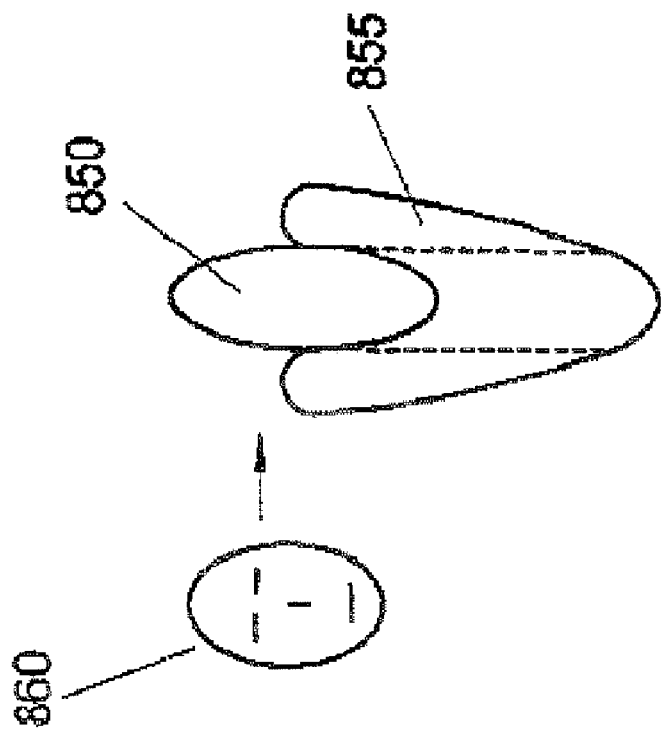
FIG. 14 is a front view of a seventh embodiment of the airbag.

FIG. 14 shows a seventh exemplary embodiment of the airbag 80 in a cross sectional front view. It can be seen that the supporting chamber 850 is arranged in the upper internal region of an energy absorption chamber 855 which is approximately Y- or V-shaped in cross section. In addition, the manner in which the occupant's head 860 plunges into the airbag 80 in the event of an accident can be seen with reference to an arrow.

Figure 15:
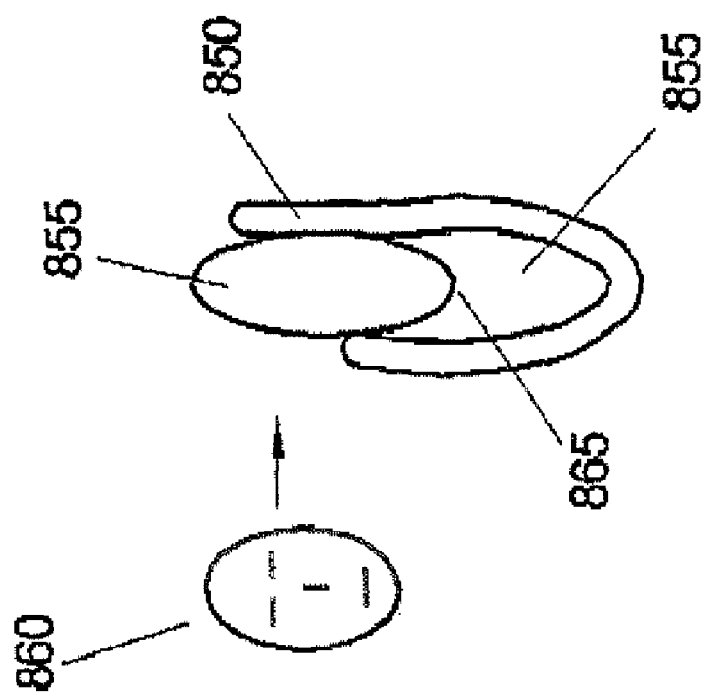
FIG. 15 is a front view of an eighth embodiment of the airbag.

FIG. 15 shows an eighth exemplary embodiment of the airbag 80 in a cross sectional front view. It can be seen that the supporting chamber 850 is of approximately J-shaped configuration in cross section and partially encloses the energy absorption chamber 855, which is held together by an intercepting strap 865.

Figure 16:
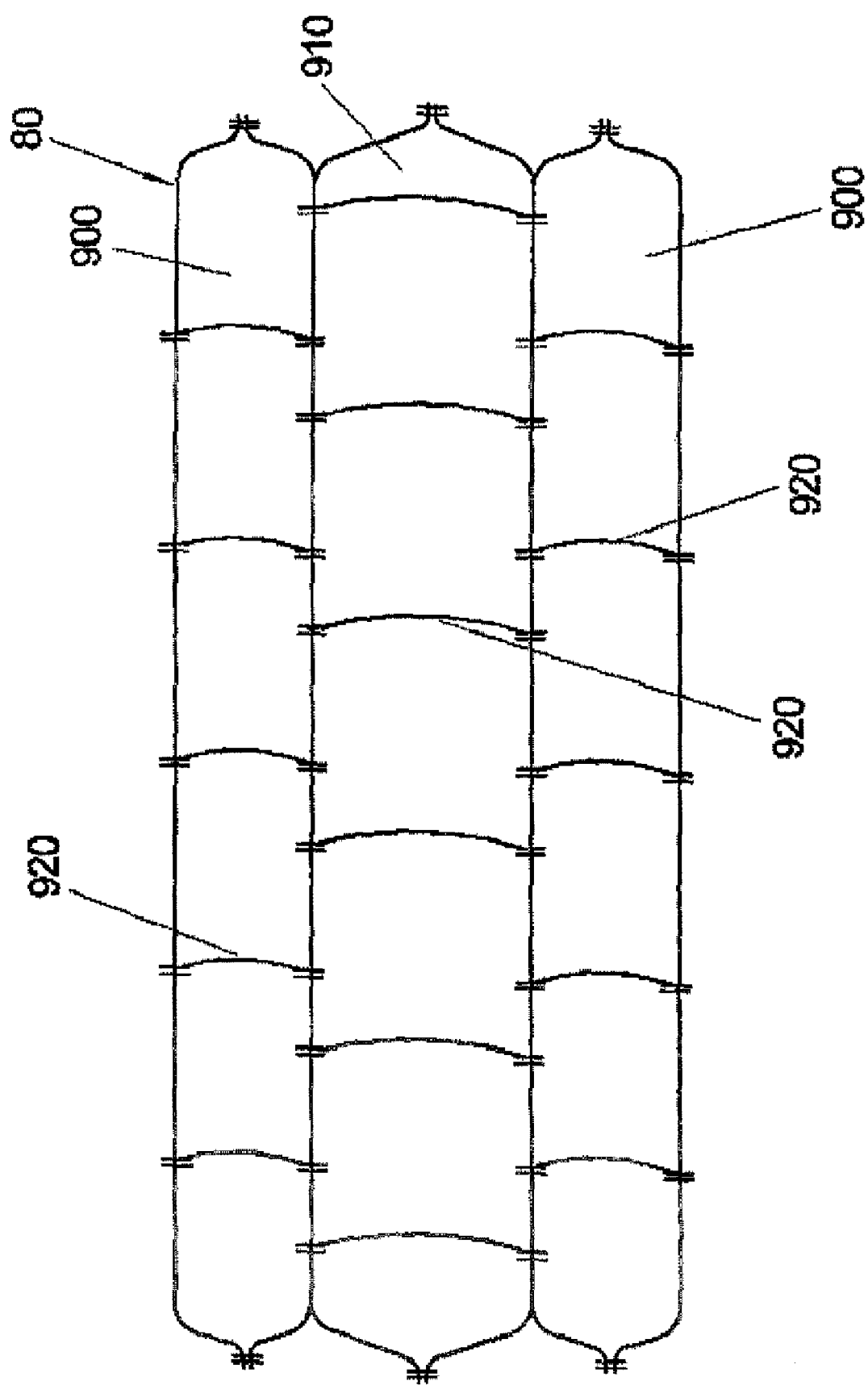
FIG. 16 is a side view of a ninth embodiment of the airbag.

FIG. 16 shows a ninth exemplary embodiment of the airbag 80 in a side view. It can be seen that two supporting chambers 900 surround an energy absorption chamber 910. All of the chambers are, in each case, of "planar" design and are held together in the transverse direction of the vehicle by intercepting straps 920.

In the case of the airbags according to FIGS. 1 to 16, the sequence in which the individual airbag chambers are inflated is unimportant. For example, the supporting chambers can be inflated first and the absorption chambers subsequently. Alternatively, the sequence may also be reversed or the inflation may take place simultaneously. The supporting chambers and the absorption chambers may be filled by separate gas generators.

The priority application DE 10 2005 006 634.8 filed Feb. 10, 2005 is incorporated by reference herein.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag for an occupant protection device of a vehicle, comprising:
   at least two supporting chambers for providing mechanical stability in the inflated state, wherein the two supporting chambers are arranged spaced apart in a longitudinal direction of the vehicle forming a single column of supporting chambers; and
   at least one energy absorption chamber associated with the at least two supporting chambers; and
   wherein the at least one energy absorption chamber is more gas permeable than the at least two supporting chambers;
   wherein the at least one energy absorption chamber is configured to absorb more energy than the at least two supporting chambers during a first phase of an accident,
   wherein the at least two supporting chambers form a supporting plane; and
   wherein the at least one energy absorption chamber surrounds the single column of the at least two supporting chambers such that a first portion of the energy absorption chamber is arranged on a side of the supporting plane which faces a vehicle occupant to be protected and a second portion of the energy absorption chamber is arranged on an opposite side of the supporting plane at a side which faces away from the vehicle occupant to be protected.

2. The airbag according to claim 1, wherein the at least two supporting chambers comprise a gastight gas bag that provides a supporting action for a period of time of at least 2 seconds.

3. The airbag according to claim 1, wherein the at least two supporting chambers are deployable upwards at least essentially in parallel in a pillar-shaped manner.

4. The airbag according to claim 1, wherein the energy absorption chamber includes at least one intersection strap extending between two supporting chambers.

5. An airbag for an occupant protection device of a vehicle, comprising:
   a first material layer; and
   a second material layer connected to the first layer;
   wherein the two connected material layers are folded along a fold line and are folded onto each other in such a manner that the first material layer lies on the outside of the airbag and the second material layer lies on the inside of the airbag;
   wherein an energy absorption chamber is bounded by mutually opposite sections of the second material layer lying on the inside of the airbag,
   wherein at least two supporting chambers are bounded by mutually opposite sections of the first and second material layers, and
   wherein the mutually opposite sections of the first and second material layers are connected to each other in a region of an outer contour by a gas-permeable seam.

6. The airbag according to claim 5, wherein the first material layer and the second material layer are adhesively bonded to each other at adhesive connections.

7. The airbag according to claim 5, wherein the first material layer and the second material layer are composed of gastight material.

8. The airbag according to claim 5, wherein the absorption chamber is more gas permeable than the at least two supporting chambers.

9. The airbag according to claim 5, wherein the first material layer and the second material layer are produced by a Jacquard weaving technique and are subsequently sealed by coating.

10. The airing according to claim 5, wherein the two connected material layers are folded onto each other along an axis of symmetry of one of the two material layers.

* * * * *

UNITED STATES PATENT AND TRADEMARK OFFICE
CERTIFICATE OF CORRECTION

PATENT NO. : 7,614,648 B2  Page 1 of 1
APPLICATION NO. : 11/275787
DATED : November 10, 2009
INVENTOR(S) : Heudorfer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this

Nineteenth Day of October, 2010

David J. Kappos
*Director of the United States Patent and Trademark Office*